US012719847B2

(12) United States Patent
Stankevich

(10) Patent No.: US 12,719,847 B2
(45) Date of Patent: Aug. 25, 2026

(54) DYNAMIC SESSION HEADERS VIA REMOTE DICTIONARY

(71) Applicant: ADP, Inc., Roseland, NJ (US)

(72) Inventor: Andre Stankevich, Morganville, NJ (US)

(73) Assignee: ADP, Inc., Roseland, NJ (US)

( * ) Notice: Subject to any disclaimer, the term of this patent is extended or adjusted under 35 U.S.C. 154(b) by 59 days.

(21) Appl. No.: 18/972,526

(22) Filed: Dec. 6, 2024

(65) Prior Publication Data

US 2026/0163873 A1 Jun. 11, 2026

(51) Int. Cl.
*H04L 9/40* (2022.01)
*G06F 9/451* (2018.01)
*G06F 9/54* (2006.01)

(52) U.S. Cl.
CPC .............. *H04L 63/08* (2013.01); *G06F 9/451* (2018.02); *G06F 9/547* (2013.01)

(58) Field of Classification Search
CPC ........... H04L 63/08; G06F 9/451; G06F 9/547
USPC .............................................................. 726/4
See application file for complete search history.

(56) References Cited

U.S. PATENT DOCUMENTS 7,197,568 B2 * 3/2007 Bourne .................... H04L 67/02 713/180
2003/0005118 A1 * 1/2003 Williams ................ H04L 63/10 709/225
2013/0276070 A1 * 10/2013 Lee ......................... G06F 21/45 726/4
2014/0282979 A1 * 9/2014 Andon .................. H04L 63/083 726/7
2015/0088978 A1 * 3/2015 Motukuru ............. H04L 67/148 709/203
2015/0089614 A1 * 3/2015 Mathew .............. H04L 65/1069 726/7
2021/0218726 A1 * 7/2021 Sundararajan ...... H04L 63/0815

* cited by examiner

*Primary Examiner* — Teshome Hailu
(74) *Attorney, Agent, or Firm* — Foley & Lardner LLP

(57) ABSTRACT

Dynamic session headers for a computing session via a remote dictionary are provided. A system establishes a session responsive to receiving a first request from a browser, the session authenticated using a cookie configured to access a first electronic record. The system stores data corresponding to the session in a remote dictionary server. The system identifies a second request to modify the session to access a second electronic record and accesses, using the cookie, the data corresponding to the session from the remote dictionary server. The system receives, using a reverse proxy technique, data to update the session. The system modifies the session by storing the second identifier in the remote dictionary server and provides the browser with access to the second electronic record via the session.

16 Claims, 7 Drawing Sheets

DYNAMIC SESSION HEADERS VIA REMOTE DICTIONARY

TECHNICAL FIELD

This disclosure is directed to computing technology and, in particular, to maintaining and updating a computing session.

BACKGROUND

A computing session can be used to maintain user data across multiple interactions with a web application or site. However, infrastructure-heavy application servers that maintain sessions can bind session management to specific physical environments, which can cause performance issues, increased latency, and potential session interruptions, such as when implemented in modern or distributed systems.

SUMMARY

Technical solutions disclosed herein are directed to dynamic session headers via a remote dictionary. Maintaining or updating a session across multiple interactions presents various technical challenges. For example, web sessions can use web application servers to store and manage session data, but web application servers can be infrastructure-heavy or rely on dedicated hardware or configurations, which can limit scalability or adaptability. Aspects of the technical solutions presented herein reduce reliance on infrastructure-heavy servers and improve scalability or adaptability by offloading session data storage from traditional web application servers to a remote dictionary server, which provides efficient access to data corresponding to a session across various environments without using dedicated hardware or configurations for individual web application servers. In another example, in distributed environments where multiple servers handle user requests, traditional web application servers can replicate or copy session data across multiple servers to provide data to maintain session continuity, but replication or copying can increase processing loads as multiple servers mirror data from a variety of other servers in a network, or transmission of the replicated or copied data can introduce latency. Aspects of the technical solutions presented herein provide dynamic session headers to update a session using a remote dictionary server, which reduces transmission delays or decreases latency associated with globally distributed networks by avoiding replication or copying or by storing data centrally.

In some aspects, the techniques described herein relate to a system. The system can include one or more processors, coupled with memory. The one or more processors can establish a session responsive to receiving a first request from a browser, the session authenticated using a cookie and configured to access a first electronic record related to a first plan corresponding to a first identifier. To establish the session, the one or more processors can store data corresponding to the session in a remote dictionary server. The one or more processors can identify a second request to modify the session to access a second electronic record related to a second plan corresponding to a second identifier, the second request including the cookie. The one or more processors can access, using the cookie and in response to the second request, the data corresponding to the session from the remote dictionary server. The one or more processors can receive, using a reverse proxy technique, data to update the session. The one or more processors can modify, responsive to receipt of the data to update the session, the session by storing the second identifier in the remote dictionary server and providing the browser with access to the second electronic record via the session that was established for accessing the first electronic record.

In some aspects, the techniques described herein relate to a system, further including a reverse proxy server and one or more application programming interface (API) servers.

In some aspects, the techniques described herein relate to a system, wherein the one or more processors further display, via a graphical user interface (GUI), one or more elements corresponding to the second plan in the session.

In some aspects, the techniques described herein relate to a system, wherein the one or more processors further determine to grant access to the second electronic record based on a determination that access to the first electronic record is authorized.

In some aspects, the techniques described herein relate to a system, wherein the one or more processors further determine access to a third electronic record corresponding to a third plan based on determining access to the first electronic record or the second electronic record and display, via a graphical user interface (GUI), one or more elements corresponding to the third plan in the session.

In some aspects, the techniques described herein relate to a system, wherein the one or more processors further forward, by a reverse proxy server, using the reverse proxy technique, a plurality of requests to one or more of plurality of servers by transmitting the second request to a first server of the plurality of servers or transmitting the second request to a second server of the plurality of servers.

In some aspects, the techniques described herein relate to a system, wherein the data corresponding to the session includes a session identifier stored via the cookie, and wherein the one or more processors further authenticate the session using the session identifier.

In some aspects, the techniques described herein relate to a system, wherein the one or more processors further identify, based on the cookie and a request identifier or location corresponding to the second request, an application programming interface (API) server of a plurality of servers is authorized to update one or more headers of the second request.

In some aspects, the techniques described herein relate to a system, wherein the one or more processors further display, via a graphical user interface (GUI), one or more elements corresponding to the first plan, update, responsive to accessing the remote dictionary server, the one or more elements to correspond with the second plan, and provide the updated one or more elements to the GUI.

In some aspects, the techniques described herein relate to a method. The method can include establishing, by one or more processors coupled with memory, a session responsive to receiving a first request from browser, the session authenticated using a cookie and configured to access a first electronic record related to a first plan corresponding to a first identifier. Establishing can include storing data corresponding to the session in a remote dictionary server. The method can include identifying, by the one or more processors, a second request to modify the session to access a second electronic record related to a second plan corresponding to a second identifier, the second request including the cookie. The method can include accessing, by the one or more processors using the cookie and in response to the second request, the data corresponding to the session from the remote dictionary server. The method can include receiving, by the one or more processors, using a reverse proxy technique, data for updating the session. The method can include modifying, by the one or more processors responsive to receiving the data for updating the session, the session by storing the second identifier in the remote dictionary server and providing the browser with access to the second electronic record via the session that was established for accessing the first electronic record.

In some aspects, the techniques described herein relate to a method, including displaying, by the one or more processors via a graphical user interface (GUI), one or more elements corresponding to the second plan in the session.

In some aspects, the techniques described herein relate to a method, including determining, by the one or more processors, to grant access to the second electronic record based on a determination that access to the first electronic record is authorized.

In some aspects, the techniques described herein relate to a method, including determining, by the one or more processors, user access to a third electronic record corresponding to a third plan based on determining user access to the first electronic record or the second electronic record, and displaying, by the one or more processors via a graphical user interface (GUI), one or more elements corresponding to the third plan in the session.

In some aspects, the techniques described herein relate to a method, including forwarding, by a reverse proxy server using the reverse proxy technique, a plurality of requests to one or more of a plurality of servers by transmitting the second request to a first server of the plurality of servers or transmitting the second request to a second server of the plurality of servers.

In some aspects, the techniques described herein relate to a method, wherein the data corresponding to the session includes a session identifier stored via the cookie, and including authenticating, by the one or more processors, the session using the session identifier.

In some aspects, the techniques described herein relate to a method, including identifying, based on the cookie and a request identifier or location corresponding to the second request, an application programming interface (API) server of a plurality of servers is authorized to update one or more headers of the second request.

In some aspects, the techniques described herein relate to a method, including displaying, by the one or more processors via a graphical user interface (GUI), one or more elements corresponding to the first plan, updating, by the one or more processors and in response to accessing the remote dictionary server, the one or more elements to correspond with the second plan, and providing, by the one or more processors, the updated one or more elements to the GUI.

In some aspects, the techniques described herein relate to a non-transitory computer-readable media (CRM). The non-transitory CRM can have instructions stored thereon that, when executed by one or more processors, cause the one or more processors to establish a session responsive to receiving a first request from a browser, the session authenticated using a cookie and configured to access a first electronic record related to a first plan corresponding to a first identifier. To establish the session, the instructions can cause the one or more processors to store data corresponding to the session in a remote dictionary server. The instruction can cause the one or more processors to identify a second request to modify the session to access a second electronic record related to a second plan corresponding to a second identifier, the second request including the cookie. The instruction can cause the one or more processors to access, using the cookie and in response to the second request, the data corresponding to the session from the remote dictionary server. The instruction can cause the one or more processors to receive, using a reverse proxy technique, data to update the session. The instruction can cause the one or more processors to modify, responsive to receipt of the data to update the session, the session by storing the second identifier in the remote dictionary server and providing the browser with access to the second electronic record via the session that was established for accessing the first electronic record.

In some aspects, the techniques described herein relate to a non-transitory CRM, wherein the instructions causing the one or more processors to further display, via a graphical user interface (GUI), one or more elements corresponding to the second plan in the session.

In some aspects, the techniques described herein relate to a non-transitory CRM, wherein the instructions cause the one or more processors to further determine access to a third electronic record corresponding to a third plan based on a determination of access to the first electronic record or the second electronic record and display, via a graphical user interface (GUI), one or more elements corresponding to the third plan in the session.

These and other aspects and implementations are discussed in detail below. The foregoing information and the following detailed description include illustrative examples of various aspects and implementations and provide an overview or framework for understanding the nature and character of the claimed aspects and implementations. The drawings provide illustrations and a further understanding of the various aspects and implementations and are incorporated in and constitute a part of this specification. The foregoing information and the following detailed description and drawings include illustrative examples and should not be considered as limiting.

BRIEF DESCRIPTION OF THE FIGURES

Aspects of the present disclosure are described in the detailed description which follows, in reference to the noted plurality of drawings by way of non-limiting examples of exemplary embodiments of the technical solutions described herein.

DETAILED DESCRIPTION

Following below are more detailed descriptions of various concepts related to, and implementations of, systems, methods, or non-transitory computer-readable storage media (CRM) to provide dynamic session headers via a remote dictionary. The various concepts introduced above or discussed in greater detail below can be implemented in any of numerous ways.

Aspects of technical solutions presented herein provide dynamic headers via a remote dictionary server to maintain or update a computing session. A computing session or session can refer to the storage of temporary data associated with interactions of a user across multiple requests or visits to a website. In some aspects, the technical solutions presented provide a computing platform implementing a remote dictionary server, a reverse proxy server with a dynamic module, and application programming interface (API) servers. In some aspects, the technical solutions presented herein add, modify, or reset values corresponding to a user or user account (e.g., plan number of a retirement plan of a user) within an existing session. For example, the technical solutions presented herein provide or update data corresponding to a session (e.g., headers) dynamically using a remote dictionary without ending or terminating the session.

Figure 1:
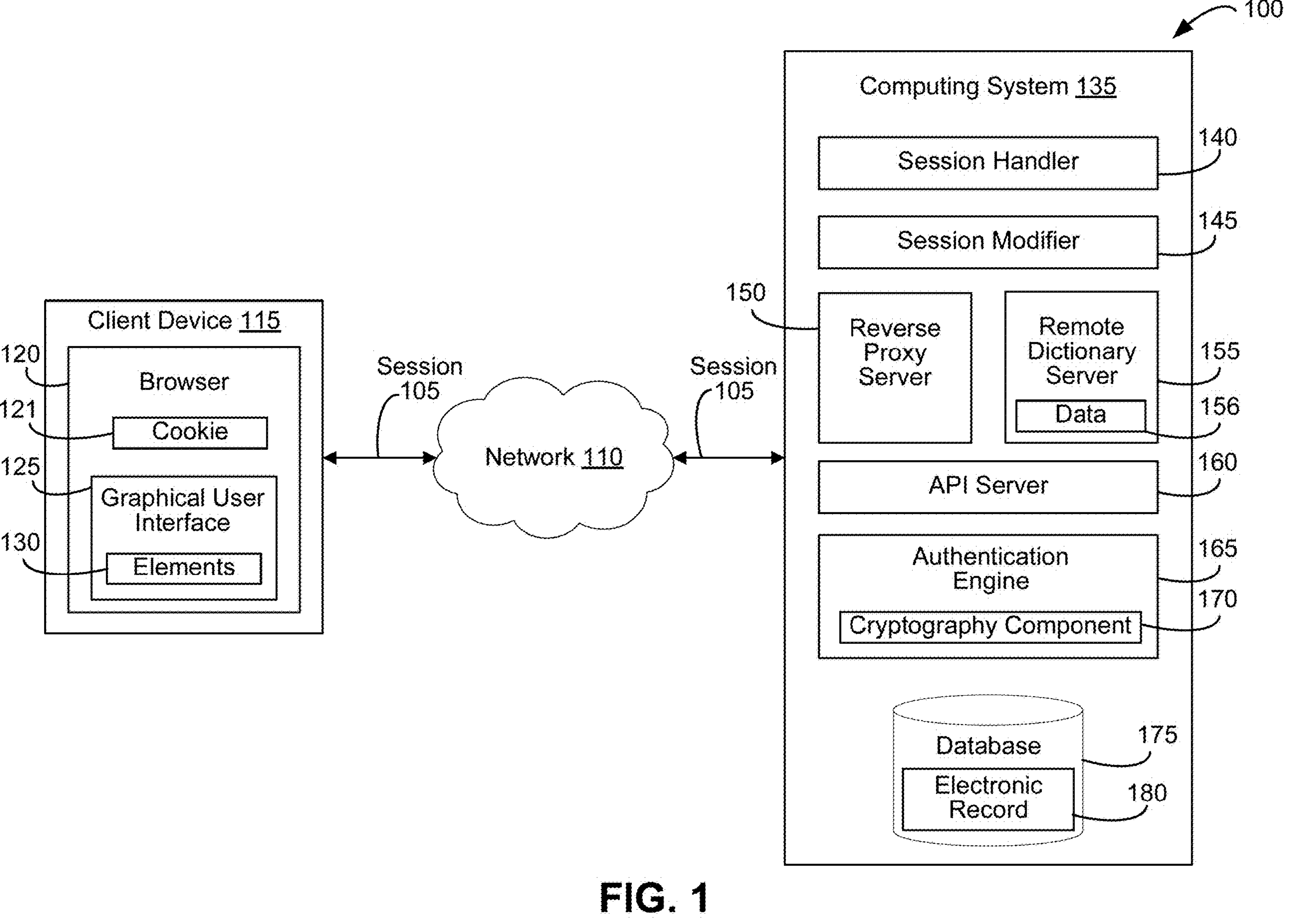
FIG. 1 is an illustrative example of a system to provide dynamic session headers via a remote dictionary, in accordance with some implementations.

FIG. 1 is an illustrative example of a system 100 for providing dynamic session headers via a remote dictionary. The system 100 can include a computing system 135 that communicates or otherwise interfaces with a client device 115 via a network 110 to establish or provide sessions 105. The client device 115 can include or execute a browser 120. The browser 120 can include cookie 121, which can be transmitted or stored via other components of system 100 (e.g., reverse proxy server 150, remote dictionary server 155, etc.). The browser 120 can include a graphical user interface (GUI) 125, which can include elements 130. The computing system 135 can include a session handler 140, a session modifier 145, a reverse proxy server 150, a remote dictionary server 155, an application programming interface (API) server 160, an authentication engine 165, and a database 175. The remote dictionary server 155 can include data 156. The authentication engine 165 can include a cryptography component 170. The database 175 can include an electronic record 180. Although the components of FIG. 1 can be described in the singular form herein (e.g., a client device 115, an API server 160), it should be understood that the system 100 can include two or more of any components (e.g., three API servers 160, two electronic records 180, etc.). Each of the components or subsystems of system 100 (e.g., client device 115, computing system 135, session handler 140, etc.) can include one or more processors coupled with memory or software and capable of performing the various processes and tasks described herein, such as maintaining or updating session 105.

The session 105 can refer to an ongoing or continuous interaction between a user device (e.g., client device 115) and a website. For example, the session 105 can be associated with data maintained throughout a period of use of a web application (e.g., browser 120). For example, the session 105 can be associated with session data stored in database 175. Further, the components of FIG. 1 can use the associated session data to maintain the session 105 or modify such data to update the session 105 (e.g., provide access to a different electronic record 180). In some aspects, session 105 can be configured to expire after a specified period of inactivity, can remain active for a predetermined duration, or can otherwise adjust in response to various conditions or instructions.

In some aspects, the components of FIG. 1 can maintain or update the session 105 to facilitate continuous browsing activity without ending the session 105 or without establishing a new session. For example, the computing system 135 can dynamically update the session 105 to reflect changes associated with a user or a user account (e.g., modifying a retirement plan number associated with a user account within session 105). In some aspects, the session 105 can be configured to access an electronic record (e.g., electronic record 180) related to a plan (e.g., retirement plan) corresponding to an identifier (e.g., string assigned to identify or reference the plan). In some aspects, the computing system 135 can establish or provide session 105 by storing data corresponding to the session 105 (e.g., session data corresponding to headers) in remote dictionary server 155.

The network 110 can include a wireless or wired connection for enabling the client device 115 or the computing system 135 to store, transmit, receive, or display information for maintaining or updating a session. The network 110 facilitates the client device 115 or the computing system 135 communicating with internal subcomponents (described herein) or external components. The computing system 135, for example, receives data corresponding to the client device 115, browser 120, or GUI 125 via the network 110. For example, computing system 135 can receive a request transmitted by the browser 120 executing on the client device 115. The network 110 can include a hardwired connection (e.g., copper wire or fiber optics) or a wireless connection (e.g., wide area network (WAN), controller area network (CAN), local area network (LAN), or personal area network (PAN)). For example, the network 110 can support Wi-Fi, Bluetooth, BLE, or other communication protocols for transferring data. In some aspects, one or more components of FIG. 1 (e.g., computing system 135) can use network 110 to establish, maintain, update, or modify session 105.

The network 110 can facilitate communications in accordance with various communication protocols such as Transmission Control Protocol and Internet Protocol (TCP/IP), User Datagram Protocol (UDP), or IEEE communication protocols. In one example, the network 110 can include wireless communications according to Bluetooth specification sets, or another standard or proprietary wireless communication protocol. In another example, the network 110 can also include communications over a cellular network, including, e.g., a GSM (Global System for Mobile Communications), CDMA (Code Division Multiple Access), EDGE (Enhanced Data for Global Evolution) network.

The components of FIG. 1 (e.g., client device 115, computing system 135) can communicate by transmitting, receiving, and processing requests and responses via the network 110 using any communication protocol described herein. In some aspects, the components of FIG. 1 transmit or receive requests including one or more headers (e.g., HTTP headers), which can correspond with session 105 and can be modified, accessed, or stored to update session 105. For example, the components of FIG. 1 can modify or update the headers to reflect changes associated with a user or session 105. In some examples, the network 110 can facilitate communications between the reverse proxy server 150 and API server 160.

In some aspects, the client device 115, computing system 135, session handler 140, session modifier 145, reverse proxy server 150, remote dictionary server 155, API server 160, authentication engine 165, cryptography component 170, and database 175 can include any combination of hardware and software. In some aspects, the client device 115, computing system 135, session handler 140, session modifier 145, reverse proxy server 150, remote dictionary server 155, API server 160, authentication engine 165, cryptography component 170, and database 175 can include any computing device including one or more processors coupled with memory or software and capable of performing the various processes and tasks described herein.

The client device 115 can include a laptop, a desktop computer, a smart phone, a tablet, etc. In some aspects, the client device 115 can be operated by or associated with a user or client. The client device 115 can execute various applications including any platform for performing various tasks or operations, such as a low-code platform, no-code platform, software-as-a-service platform (SaaS), web application, web browser, desktop application, or others. For example, the client device 115 can execute browser 120 to retrieve content from other computing systems and devices over network 110. In some aspects, the client device 115 can transmit a first request from browser 120 to the computing system 135 to establish session 105, and request can include data (e.g., headers) corresponding to the session 105. In some aspects, the client device 115 can display one or more elements (e.g., elements 130) via GUI 125. In some aspects, the client device 115 can update the elements 130 (e.g., responsive to computing system 135 accessing remote dictionary server 155) to correspond with one or more plans. In some aspects, the client device 115 can provide the updated elements 130 to GUI 125 for display.

The browser 120 can include any web browser or web browser application. In some aspects, the browser 120 maintains session 105 by presenting web content via an output or display of client device 115. For example, the browser 120 can receive input of a uniform resource locator (URL), such as a web address, from an input device (e.g., an input/output circuit, a pointing device, a keyboard, a touch screen, or another form of input device of client device 115) or otherwise via a user interaction with a user interface (e.g., GUI 125). In response to receiving input associated with a web address or website, the client device 115 can execute instructions from the browser 120 to cause the browser 120 to request data from another device (e.g., computing system 135, a server, etc.) connected to the network 110 referred to by the URL or address. The other device can provide webpage data or other data to the client device 115 via the browser 120, which causes the browser 120 to provide an interface or dashboard (e.g., GUI 125) to be presented in a viewport of the client device 115. For example, the browser 120 can be configured to access, store, or display web pages, sites, or other web-based information to a user of the client device 115 using GUI 125. The browser 120 can communicate with reverse proxy server 150 or a web server to retrieve content. For example, browser 120 can send requests for web pages or data to the reverse proxy server 150, and the reverse proxy server 150 can process the requests by serving cached content or forwarding the request to backend servers (e.g., API server 160) to dynamically retrieve content.

The GUI 125 can include any system or interface configured to display or present content or elements. For example, the GUI 125 can display or present web content, such as a website, accessed or retrieved by browser 120 via the client device 115. In some aspects, the client device 115 can dynamically adjust GUI 125 to modify displayed content or elements based on user interactions or changes in session 105. For example, the GUI 125 can update a display of information or modify the arrangement of elements responsive to user interaction received via client device 115. In some aspects, the client device 115 can generate the GUI 125 by executing instructions that define an arrangement or display properties of graphical elements. For example, the client device 115 can generate or update the GUI 125 by executing instructions specifying layout grids for arranging graphical components, applying CSS styles to define display properties, or rendering vector-based graphics based on session data corresponding to the session 105 or other information (e.g., user preferences of a user of the client device 115). In some aspects, the GUI 125 displays or provides elements 130.

The elements 130 can include any combination of interactable elements (e.g., radio buttons, sliders, text input boxes, etc.) or content (e.g., images, textual descriptions, icons, etc.). The elements 130 can be configured to facilitate user interaction with browser 120 by accepting user input, displaying information, or causing the GUI 125, browser 120, or client device 115 to perform actions in response to user interactions. In some aspects, the client device 115 can update elements 130 via GUI 125 in response to user input. The elements 130 presented via the GUI 125 can include static elements that display consistent information or dynamic elements that can change or update based on user input or other information (e.g., headers corresponding to session 105). In some aspects, the elements 130 can include web content or other data corresponding to a website, such as text, images, videos, links, or other elements that collectively form a web page. The elements 130 can include or represent data or information associated with electronic record 180. For example, the elements 130 can display plan information corresponding to a retirement plan of a user.

The computing system 135 can provide dynamic session headers via a remote dictionary. For example, the computing system 135 can include a laptop, desktop computer, smart phone, tablet, server, database, etc., or can include a collection of such devices. The computing system 135 can include a communications unit configured to facilitate communications, or otherwise interface with, one or more components of the computing system 135 or the system 100. For example, the computing system 135 can facilitate communications between the reverse proxy server 150 and API server 160. The computing system 135 can correspond with an organization or can be used to perform or execute various processes associated with an organization. In some aspects, the computing system 135 can include subsystems or subcomponents, such as session handler 140, session modifier 145, reverse proxy server 150, remote dictionary server 155, API server 160, authentication engine 165, cryptography component 170, database 175, and electronic record 180.

The session handler 140 can interface with components of FIG. 1 or other subcomponents of computing system 135 to perform various tasks or processes for maintaining or managing session 105. For example, the session handler 140 can transmit or receive requests or responses. For example, the session handler 140 can access, store, or update data in a database or data store in response to requests. In some aspects, the session handler 140 can establish session 105 responsive to a first request from browser 120 by storing data corresponding to session 105 in remote dictionary server 155. In some aspects, the session handler 140 can be configured to provide continuity of session 105 during multiple user interactions with browser 120 by retrieving or updating session data in response to detected user interactions via the client device 115 without terminating or suspending session 105.

The session modifier 145 can modify or update a session. In some aspects, the session modifier 145 can process updates or requests initiated or received via other subsystems of the computing system 135 without causing termination of session 105. For example, the session modifier 145 can update session 105 by storing or modifying data corresponding to session 105 (e.g., request headers). In some aspects, the session modifier 145 can modify the session 105 by updating data 156 stored in remote dictionary server 155 based on user actions or communications received via client device 115 (e.g., a request to change plans). For example, the session modifier 145 can update the session 105 to reflect a change in a user account or access from a first plan to a second plan by storing a new identifier (e.g., plan number) corresponding to the second plan in the remote dictionary server 155. The session modifier 145 can modify, responsive to receipt of data to modify session 105, the session 105 to provide a user of client device 115 with access to a second electronic record 180 corresponding to a second plan via the session 105. The session modifier 145 can further update session 105 to reflect additional updates to the session 105 or to a user account by modifying stored data (e.g., user ID, user type, client ID, authentication mode, expiration time, etc.) to include information (e.g., identifiers or numbers) corresponding to a third plan, a fourth plan, etc. using the remote dictionary server 155.

The reverse proxy server 150 can transmit, process, or forward requests or responses. For example, the reverse proxy server 150 can be configured both as a reverse proxy by forwarding requests to backend components or endpoints (e.g., API server 160 or database 175), and as a web server by providing content or elements to the client device 115 (e.g., HyperText Markup Language (HTML), Cascading Style Sheets (CSS), or image files) with or without additional processing by backend systems. For example, the reverse proxy server 150 can include an NGINX server. In some aspects, the reverse proxy server 150 can include a dynamic module, which can execute or performs various aspects described herein with regard to the reverse proxy server 150. For example, the dynamic module can update request headers, forward requests to API servers 160, store or update data via remote dictionary server 155, and so on as described regarding the reverse proxy server 150.

In some aspects, the reverse proxy server 150 can forward requests (e.g., received via the client device 115) to appropriate subsystems or components of the computing system 135 using a reverse proxy technique. A reverse proxy technique can refer to the use of an intermediary server to intercept and inspect incoming requests before the requests are received by endpoints. In some aspects, the reverse proxy server 150 can route requests to different API servers 160. For example, the reverse proxy server 150 can transmit or route requests to API server 160 based on inspecting request headers to identify parameters such as request type, content, or endpoint addresses. For example, the reverse proxy server 150 can route a request to a first server configured for authentication or a second server configured for updating a plan based on content or information associated with a received request. In some aspects, the reverse proxy server 150 can update request headers or manage request paths to verify that forwarded requests reach an intended destination. In some examples, the reverse proxy server 150 can modify request headers to format or standardize forwarded requests for transmission to selected endpoints or APIs. In some aspects, the reverse proxy server 150 can include or interface with a load balancer. The reverse proxy server 150 can cause the load balancer to balance or manage multiple incoming requests by distributing or transmitting incoming requests across multiple servers (e.g., a first and second API server 160).

The remote dictionary server 155 can store, manage, or provide data 156 corresponding to session 105. In some aspects, the remote dictionary server 155 stores data 156 including session identifiers, cookies, or other metadata. In some aspects, the remote dictionary server 155 can be configured to store session data 156 when session 105 is established in response to receiving a first request from the browser 120. For example, the session handler 140 can store data 156 corresponding to the session in the remote dictionary server 155 to facilitate subsequent access or modification by the session modifier 145. The remote dictionary server 155 can include access controls or policies restricting access or updates to stored data. For example, the remote dictionary server 155 can be configured to grant access to data 156 responsive to receiving a cookie including user authentication information. In some examples, the remote dictionary server 155 can include memory to store data 156 in a format such as key-value pair. The remote dictionary server 155 can provide access to session data (e.g., data 156) to various components of FIG. 1 (e.g., session handler 140, session modifier 145, reverse proxy server 150, etc.) for maintaining or updating the session 105. For example, the reverse proxy server 150 of computing system 135 can access the remote dictionary server 155 to retrieve a session identifier or to update a stored value of data 156 to reflect a change in session state or user data. In some examples, the remote dictionary server 155 can be configured to support and enforce data expiration policies by, for example, automatically removing portions of data 156 after a specified period of inactivity to manage memory resources. In other examples, the remote dictionary server 155 can maintain or store data 156 indefinitely.

The data 156 can include any data or information corresponding to session 105. For example, data 156 can include session identifiers corresponding to cookies (e.g., cookie 121), a user ID, a user type, a client ID, an authentication mode (e.g., single sign-on (SSO)), or an expiration time. In some aspects, storing data 156 in the remote dictionary server 155 establishes session 105 by linking user-specific data (e.g., user ID, session identifier, authentication mode, etc.) to a session identifier stored in cookie 121 on browser 120. For example, when the user performs an action (e.g., login), the session handler 140 can generate the session identifier and associate the session identifier with the user data by storing the session identifier and the user data in the remote dictionary server 155. In subsequent interactions (e.g., retrieving account balances), requests transmitted between components of system 100 (e.g., session handler 140, session modifier 145, etc.) can include or reference the generated cookie and use the included session identifier to retrieve corresponding session data from the remote dictionary server 155. Once stored, components of the system 100 (e.g., the reverse proxy server 150, the API server 160, etc.) can access data 156 to maintain continuity of session 105 and provide content or information (e.g., plan information) to a user within the session 105.

For example, the reverse proxy server 150 can receive a request from the browser (client device 115) responsive to storing data 156 to establish session 105 and can retrieve the stored session identifier or other session-related data from the remote dictionary server 155. For example, the API server 160 can retrieve the data 156 corresponding to the session to authenticate the user device or client device 115, retrieve user-specific information (e.g., account balances or plan data), and update the session. Updating data 156 can modify the session 105 by changing stored values (e.g., updating the user type or session expiration time) that can be subsequently accessed and provided to a user within session 105. For example, data 156 can be modified or updated, the API server 160 or reverse proxy server 150 can access the updated data 156 from the remote dictionary server 155 to update displayed information on the browser 120.

The API server 160 can update, process, or access data. In some aspects, the API server 160 can include one or more application programming interface servers configured to process incoming requests, perform actions such as updating data or retrieving information, and provide responses. In some aspects, the API server 160 can receive requests forwarded from the reverse proxy server 150. In some examples, the API server 160 can receive a login request from the client device 115 and via the reverse proxy server 150, and the request can include user credentials (e.g., user ID and password). Upon receiving the request, the API server 160 can validate or verify the user credentials or execute additional security checks. In some examples, the API server 160 can be configured to call or transmit requests to other API servers responsive to receiving a request. In some aspects, the API server 160 can be configured to interface with a database (e.g., database 175) to retrieve information corresponding to session 105, such as a plan number or identifier associated with a user of client device 115. In some examples, the API server can be configured to update or cause the update of session data corresponding to session 105. For example, the API server 160 can add an HTTP header with key-value pairs (e.g., user type, session expiration time) to a received request and transmit the modified received request to the reverse proxy server 150, which can cause the reverse proxy server 150 to update the session data stored in remote dictionary server 155.

The authentication engine 165 can authenticate user credentials or manage access permissions associated with a session (e.g., session 105). In some aspects, the API server 160 or the reverse proxy server 150 can send a request to the authentication engine 165 to verify or authentication access to the session 105. For example, in response to receiving a login request or access request from the client device 115 via the reverse proxy server 150, the API server 160 can forward the request, including the session identifier or cookie 121, to the authentication engine 165. The authentication engine 165 can retrieve session data, such as the session identifier or cookie values (e.g., user ID, authentication mode, session expiration time) from a database (e.g., database 175). The authentication engine 165 can compare the data from the database to the received session data to confirm the validity of the session 105. Specifically, the authentication engine 165 can validate the session 105 by verifying that the session identifier corresponding to cookie 121 exists, is active, or matches stored session information. In response to validation or authorization, the authentication engine 165 can grant or deny the requested access by updating or confirming access permissions for the session 105. In some examples, the authentication engine 165 can be configured to determine access to one electronic record based on previously granted access to another electronic record. For example, the authentication engine 165 can access or store historical data corresponding to a previous access request corresponding to electronic record 180 and, in response to determining the previous access request was granted or successful, provide the user with access to the electronic record 180 or a related record (e.g., second plan). In some aspects, the authentication engine 165 can include cryptography component 170.

The cryptography component 170 can encrypt or decrypt data associated with session 105. For example, the cryptography component 170 can apply encryption functions to secure cookies, session identifiers, or other authentication information to maintain the confidentiality or security of data used in maintaining or updating session 105. In some aspects, the cryptography component 170 can apply various encryption techniques to encrypt data transmitted between the client device 115 and computing system 135, such as symmetric encryption algorithms (e.g., AES) or asymmetric encryption algorithms (e.g., RSA). In some aspects, the cryptography component 170 can create, store, and manage encryption keys used during authentication. For example, the cryptography component 170 can be configured to generate keys for securing session data corresponding to session 105. In some aspects, the cryptography component 170 can securely transmit encrypted session identifiers, cookies, and other session-related data between the remote dictionary server 155 and the client device 115 to prevent unauthorized access to session data. In some examples, the cryptography component 170 can support key rotation or expiration policies and be configured periodically update encryption keys to improve data security. For example, the cryptography component 170 can manage or enforce key expiration policies based on session expiration times prevent expired sessions from being reused. In some aspects, the cryptography component 170 can verify digital signatures or certificates to verify the authenticity and integrity of requests or associated data during transmission. For example, the cryptography component 170 can verify digital signatures when session data is accessed or modified to confirm that session updates are authenticated and secure.

The database 175 can include any memory, storage, or cache for storing information or data structures of the system 100. In some aspects, the database 175 can include one or more database servers. The database 175 can store any information associated with the system 100 and provides such data for access by any components of the system 100 (e.g., communication methods described herein). In some aspects, information in the database 175 is stored using any type of memory, such as a cloud or hard drive. The database 175 includes, for example, random access memory (RAM), dynamic random access memory (DRAM), static random access memory (SRAM), error-correcting code (ECC), read only memory (ROM), programmable read only memory (PROM), or electrically erasable read only memory (EEPROM). The information or data structures (e.g., records, tables, lists, or spreadsheets) contained within database 175 can be dynamic and change periodically (e.g., daily or by milliseconds); via an input from a user (e.g., a user operating the client device 115); via inputs from various components of the system 100 (e.g., computing system 135) and subcomponents of the computing system 135 (e.g., session handler 140, session modifier 145, etc.), or via an external update to the system 100. In some aspects, the database 175 is local to or remote from the computing system 135. For example, the database 175 can correspond to or be maintained by an outside entity. In some aspects of the technical solutions described herein, the database 175 can be maintained, owned, or operated by the same entity as an entity maintaining, owning, or operating the computing system 135. Although a single database 175 is depicted, the database 175 can include multiple databases.

The data stored in the database 175 can include a variety of user-related or system-related information, including, but not limited to, electronic records (e.g., electronic record 180), user profiles, transaction histories, account balances, plan details, etc. For example, the database 175 can store information corresponding one or more retirement plans such as contribution histories, beneficiary designations, investment allocations (e.g., fund selections, stock holdings, etc.), and correspond user information (e.g., user ID corresponding to plan). In some aspects, the database 175 can store metadata or historical data associated with session 105, such as timestamps of user logins, session durations, or last-accessed records. In some aspects, the database 175 can be updated to reflect a change, such as an update in a retirement plan status associated with a user, a new transaction entry, or changes to account settings. In some aspects, the database 175 can store and manage data across multiple databases or partitions, which can be local or remote relative to computing system 135. For example, database 175 can be maintained by an external entity, such as a financial institution, or integrated with third-party data sources for retrieving or synchronizing retirement plan information. In some configurations, the database 175 can implement data access controls to restrict or permit access based on user permissions, session state, or other parameters or policies. For example, the database 175 can implement data retention policies to verify that data is stored for a specified duration or automatically archived or deleted after a certain period.

The electronic record 180 can include any form of digital data associated with a user account, session 105, or other system information. The electronic record 180 can store information specific to a retirement plan or other user-related details, such as plan documents, transaction records, beneficiary information, or account statements. For example, electronic record 180 can include records or information corresponding to a retirement plan associated with a user of client device 115, such as contributions, investment allocations, account balances, or plan-related communications (e.g., notifications regarding changes to coverage or user status). In some examples, the electronic record 180 can include status information associated with a plan, such as active or inactive plan statuses, pending updates, or historical logs storing changes to plan information over time. In some aspects, the client device 115 can display associated with electronic record 180 to a user via GUI 125. For example, the client device 115 can update elements 130 to include information corresponding to electronic record 180. In some aspects, the electronic record 180 can include linked references to other records, such as associated plans, sub-accounts, or related financial products, to provide a unified framework for accessing or managing a retirement profile associated with the user. Although a single electronic record 180 is depicted, the electronic record 180 can refer to multiple electronic records (e.g., a first electronic record, second electronic record, third electronic record, etc.).

Figure 2:
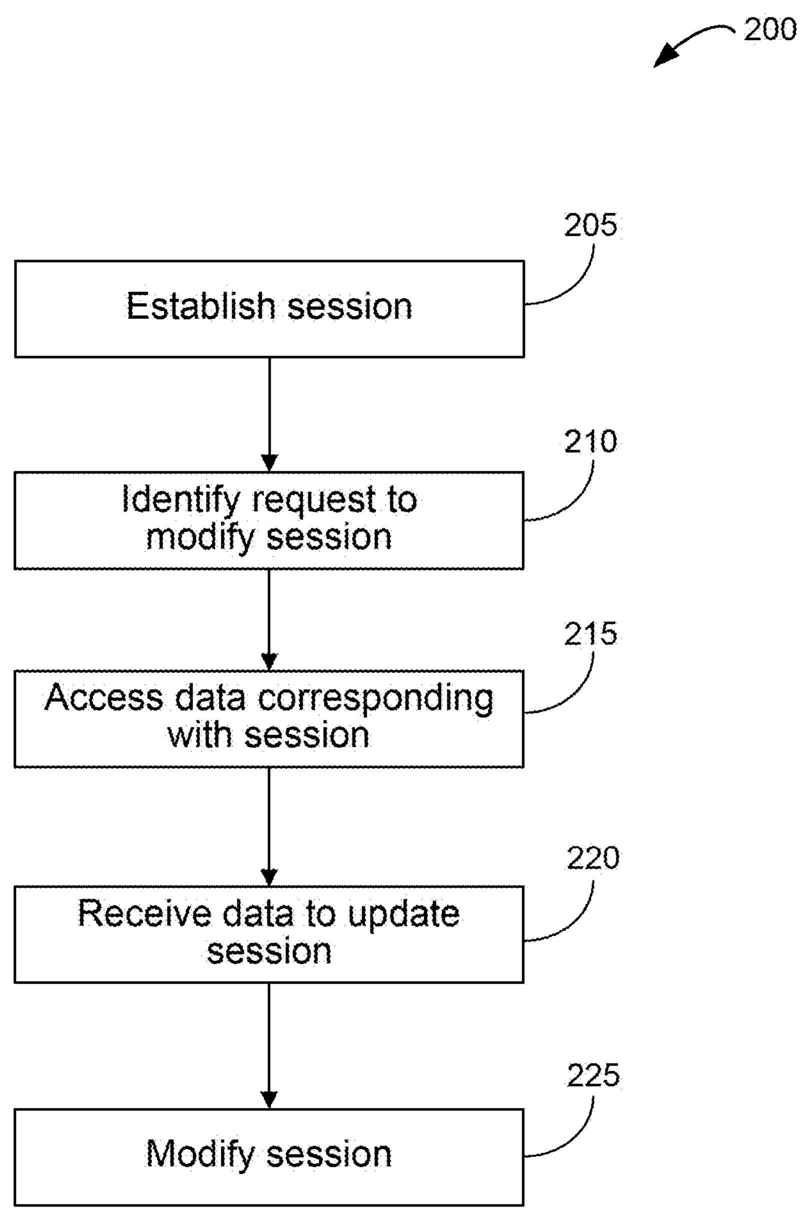
FIG. 2 is an illustrative example of a method to provide dynamic session headers via a remote dictionary, in accordance with some implementations.

FIG. 2 shows an illustrative example of a method 200 to provide dynamic session headers via a remote dictionary. Method 200 can be implemented using various systems, devices, or components discussed herein (e.g., system 100 of FIG. 1, system 300 of FIG. 3, system 400 of FIG. 4, system 500 of FIG. 5, system 600 of FIG. 6, etc.). Method 200 can include acts 205-225. At act 205, a session can be established. At act 210, a request to modify the session can be identified. At act 215, data corresponding to the session can be accessed. At act 220, data to update the session can be received. At act 225, the session can be modified.

At act 205, a session can be established. In some aspects, one or more processors can establish a session responsive to receiving a first request from a browser. For example, establishing a session can include the one or more processors receiving a user login request via the browser, validating user credentials (e.g., a username and password), and storing session-related data. In some aspects, to establish the session, the one or more processors store data corresponding to the session in a remote dictionary server. For example, session data can be stored in the remote dictionary server using various data types or formats (e.g., key-value pair, etc.), and the remote dictionary server can provide access to the session data corresponding to a session to various components (e.g., an API server or reverse proxy server). In some aspects, the session can be authenticated using a cookie. For example, a session cookie can be transmitted to the client device and stored in the browser to maintain the session state across multiple or subsequent requests. The session can be configured to access a first electronic record. For example, the session can facilitate the user retrieving information related to a specific account, service, or plan. In some aspects, the first electronic record can be related to a first plan corresponding to a first identifier. For example, the first electronic record can store details related to a retirement plan of a user, including a plan number to identify the plan and other information (e.g., plan types, transaction histories, etc.).

At act 210, a request to modify the session can be identified. In some aspects, one or more processors can identify a second request to modify the session. For example, the one or more processors can detect that the user has submitted a request through the browser to access a different plan, account, or service corresponding to the session. In some aspects, the second request can be a request to modify the session to access a second electronic record. For example, the second request can include an input from the user to update the session with new data, such as a request to switch from a first retirement plan to a second one within the same session. In some aspects, the second electronic record can be related to a second plan corresponding to a second identifier. For example, the second electronic record can store details about another retirement plan or account associated with the user, and the one or more processors can use the second identifier to locate and retrieve a corresponding record from a database or data store. In some aspects, the second request can include the cookie. For example, the request to modify the session can include a session cookie (e.g., NGXHSC cookie) previously transmitted to a client device to authenticate the session and can be used to retrieve or update the corresponding session data from the remote dictionary server.

At act 215, data corresponding to the session can be accessed. In some aspects, one or more processors can access data corresponding to the session from the remote dictionary server. For example, the one or more processors can access session-related information, such as user-specific identifiers, session expiration times, or plan details, etc., using a key-value pair stored in the remote dictionary server. In some aspects, the one or more processing circuits access the data using the cookie and in response to the second request. For example, the one or more processors can receive the request to update the session including a cookie with a session identifier, determine or extract the session identifier, and query or request the remote dictionary server to return or modify data corresponding to the session identifier.

At act 220, data to update the session can be received. In some aspects, the one or more processors can receive data to update the session. For example, data to update the session can include changes to user or account data, such as a newly selected plan number, updated session expiration time, or modified user account permissions. For example, the one or more processors can receive information corresponding to a second plan via headers included in a request and apply, store, or modify the data included in the headers to update the session. In some aspects, the one or more processors can receive the data to update the session using a reverse proxy technique. For example, the one or more processors can forward the request to the reverse proxy server for load balancing by distributing a request across one or more of multiple API servers by dynamically selecting an API server to process the request based on various parameters (e.g., server load, request type, geographic location of servers, etc.). For example, the one or more processors can use the reverse proxy server to retrieve updated session data (e.g., modified user credentials or plan details) from a selected API server and forward the updated data back to the client device.

At act 225, the session can be modified. In some aspects, the one or more processors can modify the session to store the second identifier in the remote dictionary server. For example, the one or more processors can use an API server to process the session data, which can apply changes (e.g., updating the session with a new plan identifier or account details) and transmit the modified session data back to the reverse proxy server. In some aspects, the one or more processors can modify the session responsive to the receipt of the data to update the session. For example, the reverse proxy server can update the session stored in the remote dictionary server (e.g., Redis) based on modified session data or other information returned from an API server, and can forward the updated session data or information to a browser to provide a user with access updated user data (e.g., new plan) while maintaining session continuity. In some aspects, the one or more processors provide the browser with access to the second electronic record via the session. For example, the one or more processors can analyze the modified session data to grant the user access to additional resources or plans (e.g., a second retirement plan) and provide continuous access through the same session without requiring a session termination or re-login.

In some aspects, a system configured to execute method 200 can include a reverse proxy server and one or more application programming interface (API) servers. In some aspects, the one or more processors display, via a graphical user interface (GUI), one or more elements corresponding to the second plan in the session. For example, the one or more processors can update or modify the display of elements within a graphical user interface to display updated plan information, such as a new plan number, investment allocation schedule, or account balance associated with the second plan. For example, the one or more processors can display the updated plan information on a webpage or portal accessed via a browser without terminating a user browsing session. For example, the one or more processors can dynamically modify a personalized dashboard corresponding to a user to display real-time changes in plan information without requiring the user to refresh the page or re-login.

In some aspects of the method 200, the one or more processors can determine to grant access to the second electronic record based on a determination that access to the first electronic record is authorized. For example, the one or more processors can determine access to the second electronic record by verifying that the session token associated with the first record includes metadata or permissions that extend to the second record. For example, the one or more processors can validate a session cookie stored in the browser and confirm that user session credentials apply to provide access to both the first and second records. For example, the one or more processors can check stored access control lists (ACLs) or historical data to determine that session authorization for the first electronic record automatically grants permission to access the second electronic record. For example, the one or more processors can retrieve user-specific access parameters or privileges from session data stored in the remote dictionary server to confirm that the user is authorized to view both plans. For example, the one or more processors can identify linked access rights between the first and second plans based on stored relationships in the session data and provide access for the user to access the second plan without requesting re-authentication. In some aspects, the one or more processors can determine access to a third electronic record corresponding to a third plan based on determining access to the first electronic record or the second electronic record. For example, the one or more processors can analyze or determine session credentials and verify that the user permissions for accessing the first or second electronic record automatically extend to a third record based on access parameters such as roles, policies, or other controls. In some aspects, the one or more processors can display, via a graphical user interface (GUI), one or more elements corresponding to the third plan in the session. For example, the one or more processors can update the GUI or browser to include elements corresponding to the third plan and present the elements to the user via the GUI executing on a client or user device.

In some aspects of the method 200, the one or more process can forward, by a reverse proxy server, using a reverse proxy technique, a plurality of requests to one or more of plurality of servers. For example, the one or more processors can implement a reverse proxy server to forward incoming requests across multiple back-end servers or transmit the requests to a load balancer to distribute the requests across one or more of the multiple servers. For example, the one or more processors or reverse proxy server can forward the requests based on load-balancing parameters or server availability. In some aspects, the one or more processors can forward the plurality of requests by transmitting the second request to a first server of the plurality of servers or transmitting the second request to a second server of the plurality of servers. For example, the one or more processors can forward a request to a first server located in a geographic region to reduce latency for the user. For example, the reverse proxy server can forward a request to a second server based determining that request corresponds to authentication and that the second server is configured for authentication.

In some aspects of the method 200, the data corresponding to the session includes a session identifier stored via the cookie. For example, the session identifier can be embedded within a session cookie transmitted to the client device and can be used by various components (e.g., API server, reverse proxy server) to retrieve and update session data via a remote dictionary server or database. For example, the one or more processors can process or analyze the cookie included in subsequent requests from the client device by using the API server or reverse proxy server to identify the session identifier and determine or update data, such as user-specific permissions, session expiration times, or access rights, via a remote dictionary server or a database. In some aspects of the method 200, the one or more processors can authenticate the session using the session identifier. For example, the one or more processors can extract the session identifier from the cookie received in a request, query the remote dictionary server to validate that the session is still active (e.g., by confirming that the session has not expired or been invalidated), and verify that the session identifier matches user account information or access rights stored in the session data. For example, authentication can include the one or more processing circuits comparing stored access control lists (ACLs) or other authorization parameters to confirm that the user is permitted to access the requested data. For example, the one or more processors can authenticate the session by verifying that session credentials (e.g., user type, client ID, etc.) align with authorization parameters for accessing resources or records.

In some aspects of the method 200, the one or more processors can identify an application programming interface (API) server of a plurality of servers is authorized to update one or more headers of the second request. For example, the one or more processors can analyze session data stored in the remote dictionary server, including session identifiers, user roles, or permissions corresponding to session cookie, to determine which API server is authorized or configured to handle the request. For example, the one or more processors can extract routing information or server-specific metadata from HTTP headers or the session cookie to identify the appropriate server for processing the request by, for example, routing the request to a specific API server based on the nature or content of the requested update (e.g., session identifier, cookie, etc.) or other information (e.g., geographic proximity). In some aspects, the one or more processors can identify the API server based on the cookie and a request identifier or location corresponding to the second request. For example, the cookie can include server-specific information, such as a location or a session identifier that directs the processors to route the request to the designated server responsible for handling session updates. For example, the request identifier includes an action to be performed (e.g., updating user permissions or modifying session data) by one or more API servers.

In some aspects of the method 200, the one or more processors can display, via a graphical user interface (GUI), one or more elements corresponding to the first plan. For example, the one or more processors can present plan details, account balances, or transaction histories in a user interface, such as a dashboard or webpage accessed through a browser. In some aspects, the one or more processors can update, responsive to accessing the remote dictionary server, the one or more elements to correspond with the second plan. For example, the one or more processors can modify the displayed elements to represent updated information, such as a new plan number, updated beneficiary designations, or other changes associated with the second plan. In some aspects, the one or more processors can provide the updated one or more elements to the GUI. For example, the one or more processors can dynamically refresh the GUI to display information corresponding to the updated or second plan for the user to view without reloading a web page or re-authenticating user credentials.

Figure 3:
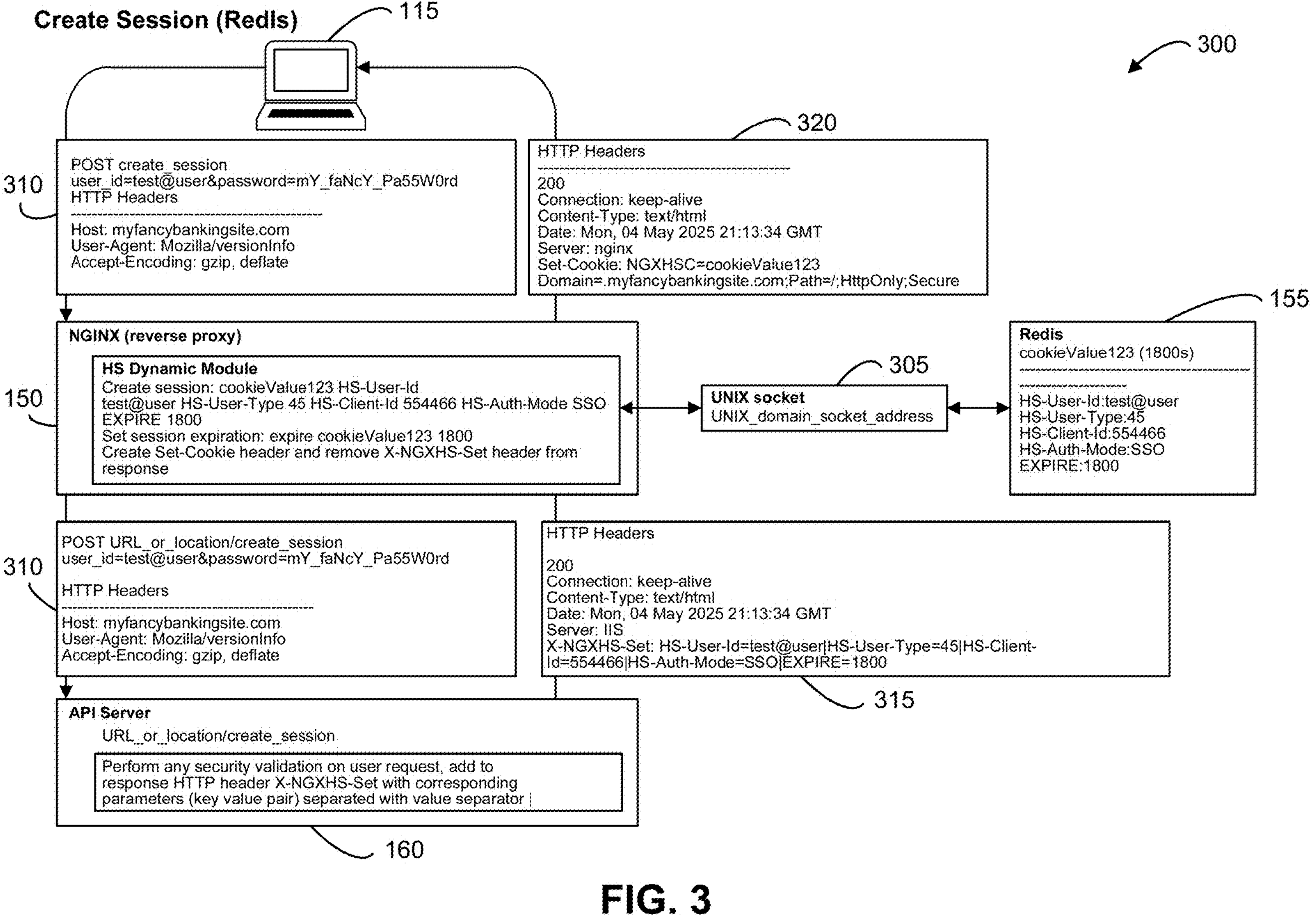
FIG. 3 is an illustrative example of a system to provide dynamic session headers via a remote dictionary, in accordance with some implementations.

FIG. 3 shows an illustrative example of a system 300 to provide dynamic session headers via a remote dictionary. In some aspects, the system 300 can create or establish a computing session. The system 300 can include client device 115, reverse proxy server 150, remote dictionary server 155, API server 160, and a UNiplexed Information Computing System (UNIX) socket 305. In some aspects, the client device 115, reverse proxy server 150, and API server 160 can transmit or receive requests 310-325.

The client device 115 can transmit a request 310 to the reverse proxy server 150 to create a session. For example, the request 310 can include user login credentials, such as a user ID (e.g., test@user) and password, which are sent in an HTTP POST request. The request 310 can also include headers, such as the user-agent (e.g., Mozilla/versionInfo), accepted encoding formats (e.g., gzip, deflate) or host. The headers can be updated during subsequent requests (e.g., requests 315-320) to reflect session-specific information or to carry session-related data, such as session cookies or associated session parameters. The reverse proxy server 150 can inspect the request 310 and detect that the request 310 is not associated with an existing session (e.g., does not include an NGINX header session (NGXHSC) cookie). The reverse proxy server 150 can forward the request 310 to the API server 160 for validation. For example, the API server 160 can validate the credentials included in the request 310, perform security checks, or retrieve session-related data (e.g., user type, client ID, authentication mode) from a database or external service. The API server 160 can generate a request 315 responsive to the request 310, which can include instructions causing the reverse proxy server 150 to create a session by storing data corresponding to the headers included in request 310 in the remote dictionary server 155. For example, the API server 160 can generate and transmit request 315 including data corresponding to a session embedded as dynamic headers. For example, the headers can include corresponding key value pairs (e.g., headers such as HS-User-Id=test@user, HS-Client-Id=554466, EXPIRE=1800, etc. separated by a value separator). In some aspects, the API server 160 can send or transmit the request 315 back to the reverse proxy server 150.

In response to receipt of the request 315, the dynamic module of the reverse proxy server 150 (header session or HS dynamic module) can process data of the request 315 to create a session. For example, the reverse proxy server 150 can check if a reverse proxy mapping (e.g., rules or instructions for processing incoming requests and routing the request to appropriate servers) permits the reverse proxy server 150 to create or modify session values. In some aspects, the reverse proxy server 150 can remove one or more headers from the request 315 (e.g., X-NGXHS-Set). The reverse proxy server 150 can generate or extract a session identifier or cookie value corresponding to the cookie (e.g., cookie Value123). The reverse proxy server 150 can verify that keys included in the request 315 match a configuration of the reverse proxy server. In some aspects, the dynamic module reverse proxy server 150 can make a call to the remote dictionary server 155 via the UNIX socket 305 to store one or more key value pairs corresponding to the session identifier in the remote dictionary server 155. The reverse proxy server 150 can make a call to the remote dictionary server 155 to set an expiration time for the session (e.g., 1800 seconds) and store the expiration time in the remote dictionary server 155. In some aspects, the reverse proxy server 150 can create a session cookie (e.g., NGXHSC=cookie Value123) and store the cookie or data corresponding to the cookie in the remote dictionary server 155.

The reverse proxy server 150 can generate a request 320 responsive to the request 315 by modifying, adding, or removing headers of the request 315. For example, the reverse proxy server can create a set-cookie header with a cookie name (e.g., NGXHSC), a corresponding cookie value (e.g., the newly generated session ID or cookie Value123) and other parameters corresponding to the cookie (e.g., domain or URL), and add the updated headers to the request 320. A browser executing on client device 115 can receive the request 320 and create a cookie based on the header information. For example, the client device 115 or browser can generate a cookie with an identifier, value, or parameters corresponding to the headers of the request 320. The client device 115 or browser can store the cookie in memory with corresponding values or parameters linking or associating the cookie with the established session.

Figure 4:
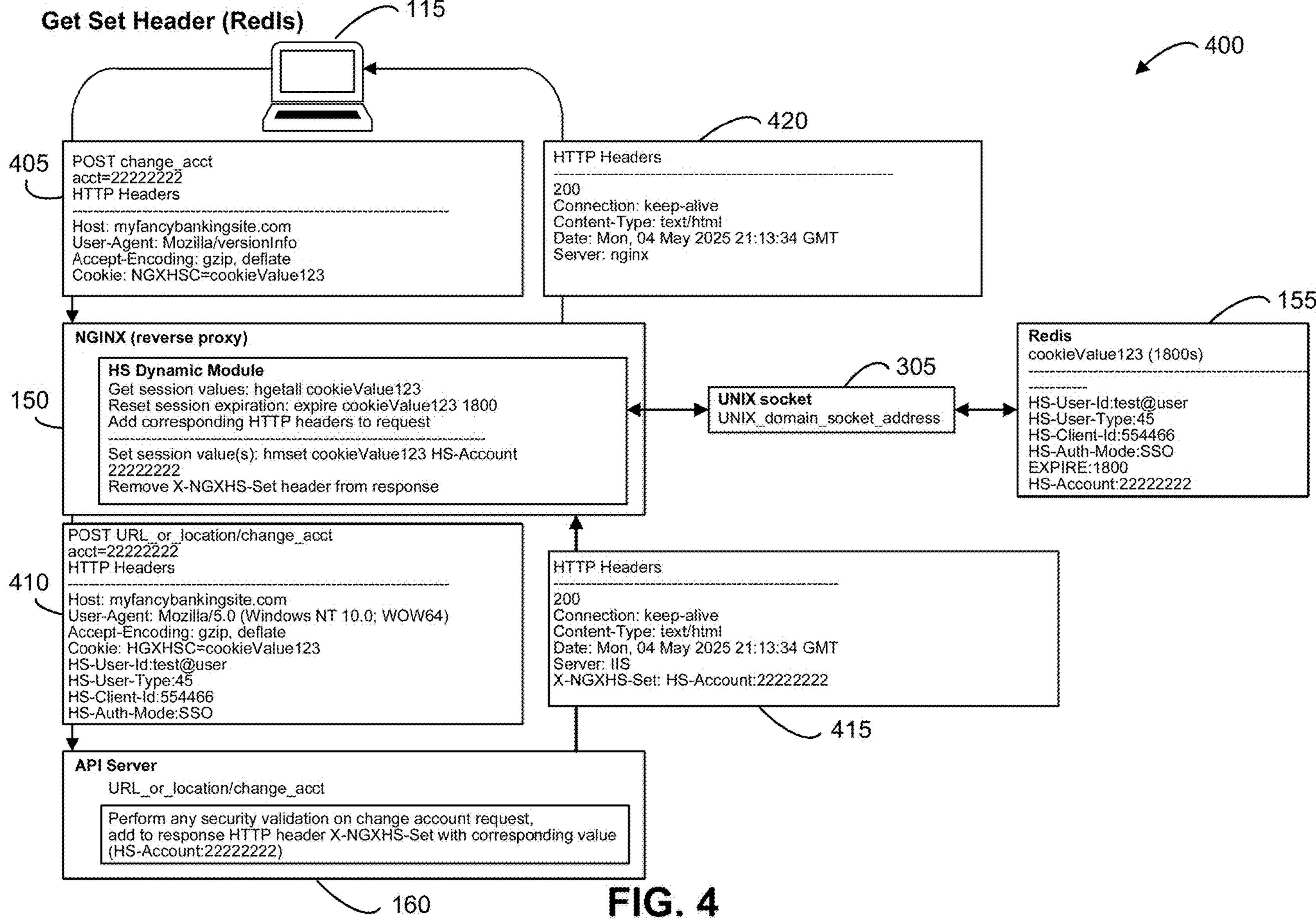
FIG. 4 is an illustrative example of a system to provide dynamic session headers via a remote dictionary, in accordance with some implementations.

FIG. 4 shows an illustrative example of a system 400 to provide dynamic session headers via a remote dictionary. In some aspects, the system 400 can modify or update a computing session or data corresponding to the session. The system 400 can include client device 115, reverse proxy server 150, remote dictionary server 155, API server 160, and a UNIX socket 305. In some aspects, the client device 115, reverse proxy server 150, and API server 160 can transmit or receive requests 405-420.

The client device 115 can receive user input to access specific account data, such as account balances or transaction histories corresponding to a plan. For example, a user can click on a link or button corresponding to a particular account. In response, the browser executing on the client device 115 can generate and transmit a request 405 to the reverse proxy server 150. The request 405 can include a session cookie (e.g., NGXHSC=cookie Value123) previously created during session establishment, and be transmitted to the corresponding URL. For example, the request 405 can include additional HTTP headers, such as host (e.g., myfancybankingsite.com), user-agent (e.g., Mozilla/versionInfo), and encoding formats (e.g., gzip, deflate).

The reverse proxy server 150 can receive the request 405 and check whether it is associated with an existing session by detecting the presence of the NGXHSC cookie. Upon detecting that the request 405 includes a valid session cookie, the dynamic module of the reverse proxy server 150 can access session data. For example, the dynamic module of the reverse proxy server 150 can determine whether the reverse proxy mapping permits injecting custom headers (e.g., hs_get_headers on). The dynamic module of the reverse proxy server 150 can execute a call to the remote dictionary server 155 via the UNIX socket 305 to retrieve session-specific data from the remote dictionary server 155, such as a user ID (e.g., HS-User-Id), or a client ID (e.g., HS-Client-Id). The dynamic module of the reverse proxy server 150 can reset the session expiration time (e.g., expire cookie Value123 1800) to maintain session continuity and add or update corresponding headers to the request 405. For example, the reverse proxy server 150 can interface or communicate with the UNIX socket 305 by using a socket address (e.g. UNIX_domain_socket_address).

The reverse proxy server 150 can forward the updated request 410 to the API server 160. For example, the request 410 can include additional session-related headers (e.g., HS-User-Id, HS-Client-Id) retrieved from the remote dictionary server 155. The API server 160 can receive the request 410 and validate the session by processing the headers and the session cookie. The API server 160 can also retrieve the relevant account data, such as the account balance, transaction history, or other details from a database or external service. In response to processing the request, the API server 160 can form a request 415 including the requested account data. For example, the API server 160 can include instructions to the reverse proxy server 150 to set or update certain headers, such as the HS-Account header (e.g., X-NGXHS-Set: HS-Account=22222222). The API server 160 can provide the request 415 as a response to the request 410 to the reverse proxy server 150, which processes the request data (e.g., headers) to update data within the session.

In response to receipt of the request 415, the dynamic module of the reverse proxy server 150 can verify that the corresponding reverse proxy mapping permits session values to be created or modified (e.g., hs_set_headers on). The dynamic module of the reverse proxy server 150 can retrieve the session ID (e.g., cookie Value123) from the NGXHSC cookie, check that the keys in the response match the configuration, and make a call to the remote dictionary 155 to update the session data (e.g., hmset cookie Value123 HS-Account=22222222). The dynamic module of the reverse proxy server 150 can remove the X-NGXHS-Set header from the request 415 and forward the updated request 420 to the client device 115.

The client device 115 can receive the request 415 and display account data (e.g., account balance, activity) corresponding to the request 415 within the browser. Subsequent requests from the client device 115 can carry the updated session headers, including the HS-Account header (e.g., HS-Account=22222222), permitting the system 400 to retrieve or update account-specific data without requiring the user to re-authenticate or switch sessions. For example, if the user clicks on a button to view account activity, the HS-Account header can instruct the API server 160 to retrieve relevant activity data for the selected account.

Figure 5:
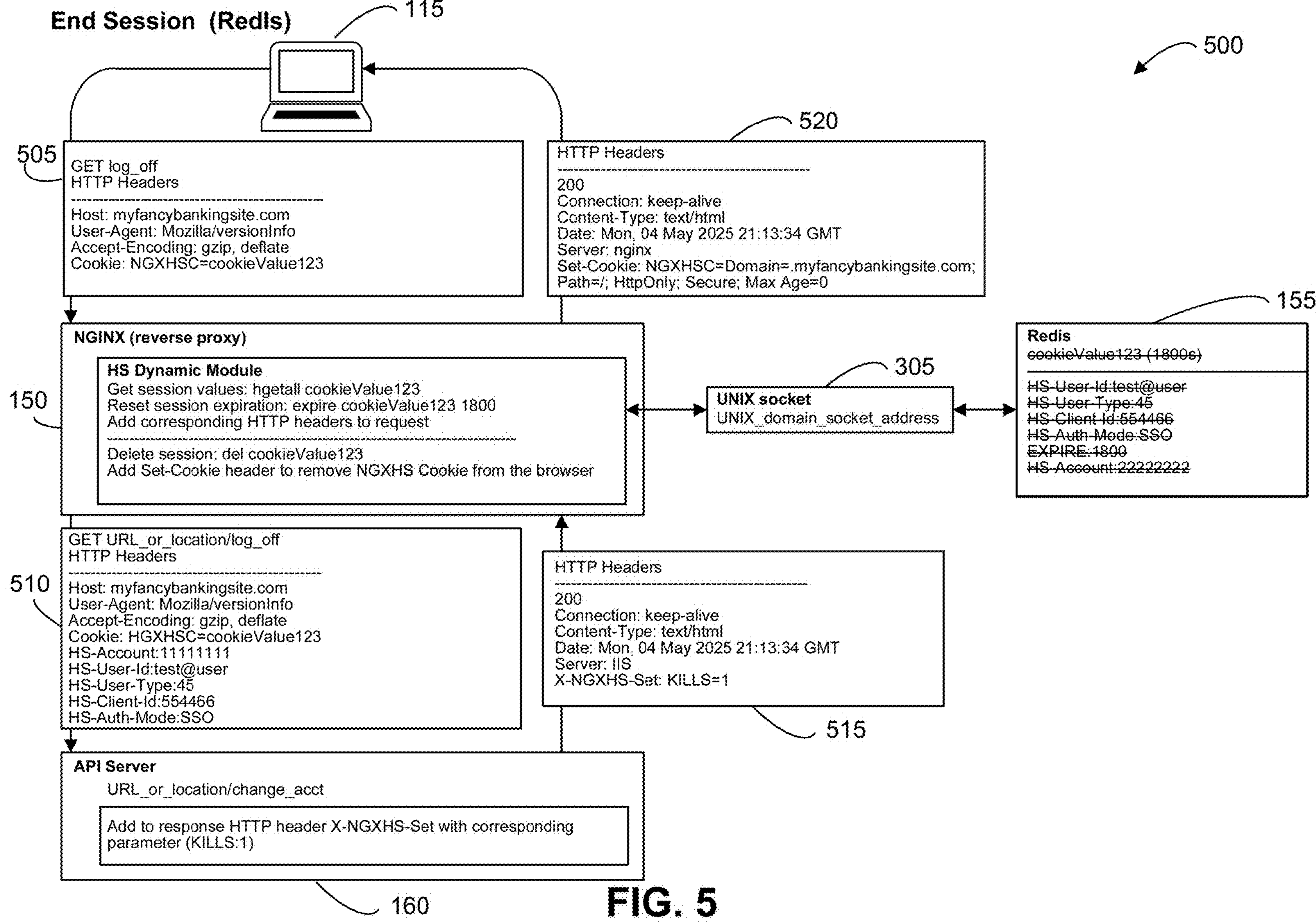
FIG. 5 is an illustrative example of a system to provide dynamic session headers via a remote dictionary, in accordance with some implementations.

FIG. 5 shows an illustrative example of a system 500 to provide dynamic session headers via a remote dictionary. In some aspects, the system 500 can delete or terminate a session and remove session data corresponding to the session from the remote dictionary server. The system 500 can include client device 115, reverse proxy server 150, remote dictionary server 155, API server 160, and a UNIX socket 305. In some aspects, the client device 115, reverse proxy server 150, and API server 160 can transmit or receive requests 505-520 to perform the session termination process.

The client device 115 can receive user input to log off from the site. For example, the user can click on a "log off" button or link in the browser. In response, the browser can generate and transmit a request 505 to the reverse proxy server 150. The request 505 can include a session cookie (e.g., NGXHSC=cookie Value123) created when the session was initially established. The request 505 can also include additional HTTP headers, such as host (e.g., myfancybankingsite.com), user-agent (e.g., Mozilla/versionInfo), and encoding formats (e.g., gzip, deflate).

In response to receipt of the request 505, the dynamic module of the reverse proxy server 150 can check if the request is associated with an active session by detecting the NGXHSC cookie. For example, the dynamic module of the reverse proxy server 150 can retrieve session data by executing a call via remote dictionary server 155 via the UNIX socket 305 to fetch key-value pairs corresponding to the session ID (e.g., HS-User-Id, HS-Client-Id, etc.). For example, the dynamic module of the reverse proxy server 150 can execute a call to the remote dictionary server 155 with the session identifier (e.g., hgetall cookie Value123) to retrieve values or data associated with the session identifier. In some aspects, the dynamic module of the reverse proxy server 150 can reset the session expiration time to maintain session continuity (e.g., expire cookie Value123 1800) or add any relevant custom headers to the request 505.

The reverse proxy server 150 can forward the updated request 510 to the API server 160. For example, the API server 160 can receive the request 510, process the session data, and validate the session. Responsive to processing the request 510, the API server 160 can generate a request 515 instructing the dynamic module of the reverse proxy server 150 to terminate the session by setting the appropriate header. For example, the API server 160 can add the header X-NGXHS-Set with a kill instruction (e.g., KILLS=1) to the request 515 which instructs the dynamic module of the reverse proxy server 150 to end or delete the session.

In response to receipt of the request 515, the reverse proxy server 150 can check if a reverse proxy mapping permits session values to be created, modified, or deleted. In this case, the HSDM can detect the kill session instruction (e.g., KILLS=1) and retrieve the session ID (e.g., cookie) from the NGXHSC cookie. The HSDM can make a call to Redis via the UNIX socket 305 to delete records associated with the session (e.g., del cookie Value123). The HSDM can also modify the headers to include an instruction for the browser to remove the session cookie (e.g., Set-Cookie: NGXHSC=; Domain=.myfancybankingsite.com; Path=/; HttpOnly; Secure; Max-Age=0). The reverse proxy server 150 can send the modified response 520 with the newly created Set-Cookie header back to the client device 115. For example, the browser can receive the response 520 and remove the NGXHSC cookie from memory, which can end the session and confirm that subsequent requests from the browser are not associated with the terminated session.

In some aspects, a session can be terminated in response to various events, such as session expiration or user logoff. For example, when a user wants to access a specific account and clicks on an account link or button, the client device 115 or browser can send a request to a corresponding URL with a previously created cookie (e.g., NGXHSC=cookie Value123). Responsive to receipt of the request, reverse proxy server 150 can detect the session by checking the cookie. For example, the reverse proxy server 150 can confirm if the reverse proxy mapping permits custom header injection and make a call to the remote dictionary server 155 to retrieve any custom headers and values using the cookie value. If the session has expired and no values are returned, the reverse proxy server 150 can check if the reverse proxy mapping or configuration permits the request without an active session. If permitted, the reverse proxy server 150 can add a Set-Cookie HTTP header to the response to remove the session cookie from the browser. For example, the header can include parameters to invalidate the cookie (e.g., Set-Cookie: NGXHSC=; Domain=.myfancybankingsite.com; Path=/; HttpOnly; Secure; Max-Age=0). The reverse proxy server 150 can send a response back to the browser, which causes the browser to delete the session cookie from memory to terminate the session.

Figure 6:
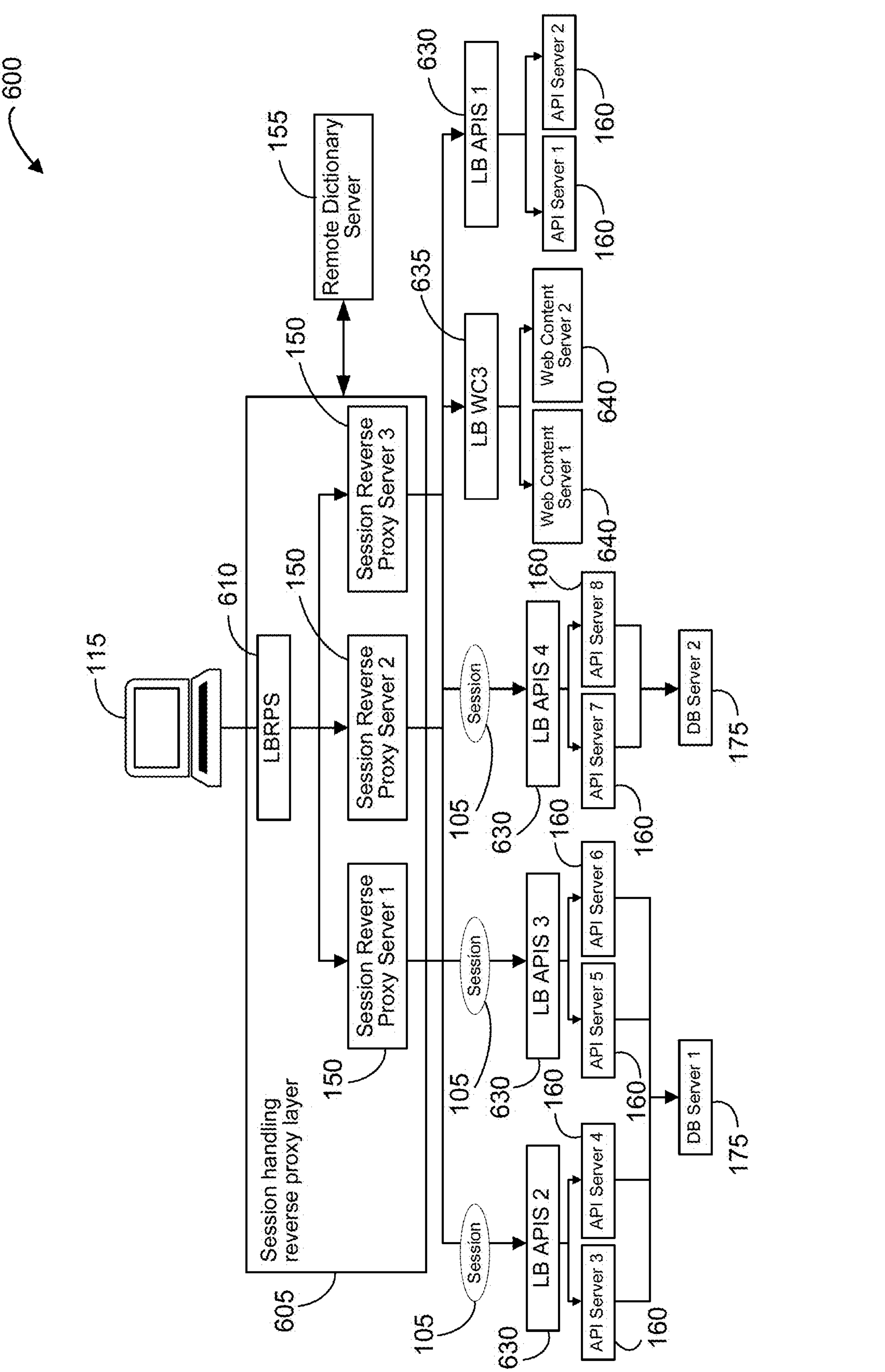
FIG. 6 is an illustrative example of a system to provide dynamic session headers via a remote dictionary, in accordance with some implementations.

FIG. 6 is an illustrative example of a system 600 to provide dynamic session headers via a remote dictionary server. In some aspects, the system 600 can establish, maintain, or update multiple sessions 105. For example, the system 600 can establish a first session, a second session, a third session, etc. and update data corresponding to one or more of the sessions to provide access to updated data to a user of client device 115. For example, the client device 115 can interface or communicate with a session handling reverse proxy layer 605. The session handling reverse proxy layer 605 can include a load balancing reverse proxy server (LBRPS) 610 and session reverse proxy servers 150. The session handling reverse proxy layer 605 can interface or communicate with the remote dictionary server 155 to store data corresponding to sessions 105.

In some aspects, the session handling reverse proxy layer 605 can interface or communicate with one or more load balancing API servers (LB APIS) 630. For example, the reverse proxy servers 150 can forward data (e.g., requests with headers) corresponding to sessions 105 using a reverse proxy technique to endpoints for further processing, updating, or authenticating. In some aspects, the load balancing API servers 630 can transmit data corresponding to the sessions 105 to one or more API servers 160. For example, the load balancing API servers 630 can forward a request to authenticate a user or to update user data (e.g., plan number) to the API servers 160. The API servers 160 can interface or communicate with database servers 175. For example, the API servers 160 can transmit requests to the database servers 175 to authenticate or update data associated with the sessions 105, and the API servers 160 can further transmit a request including the authenticated or updated data to the reverse proxy handling layer 605. Responsive to receipt of the request, the reverse proxy layer 605 can store the authenticated or updated data in remote dictionary 155 to establish or update one or more of the sessions 105. The reverse proxy layer 605 can provide the updated data to the client device 115 to provide a user of client device 115 with access to updated data within sessions 105.

The session handling reverse proxy layer 605 can interface or communicate with load balancing web content server (LB WCS) 635. In some aspects, load balancing web content server 635 can distribute incoming requests across web content servers 640. For example, the load balancing web content server 635 can route user requests for web content (e.g., images, HTML, CSS files, etc.) to one or more web content servers 640 based on factors such as server load, geographic location, or content type. The web content servers 640 can retrieve and serve the requested content or data to the reverse proxy layer 605, which can store the content or data in remote dictionary server 155 or provide the content or data to the client device 115.

Figure 7:
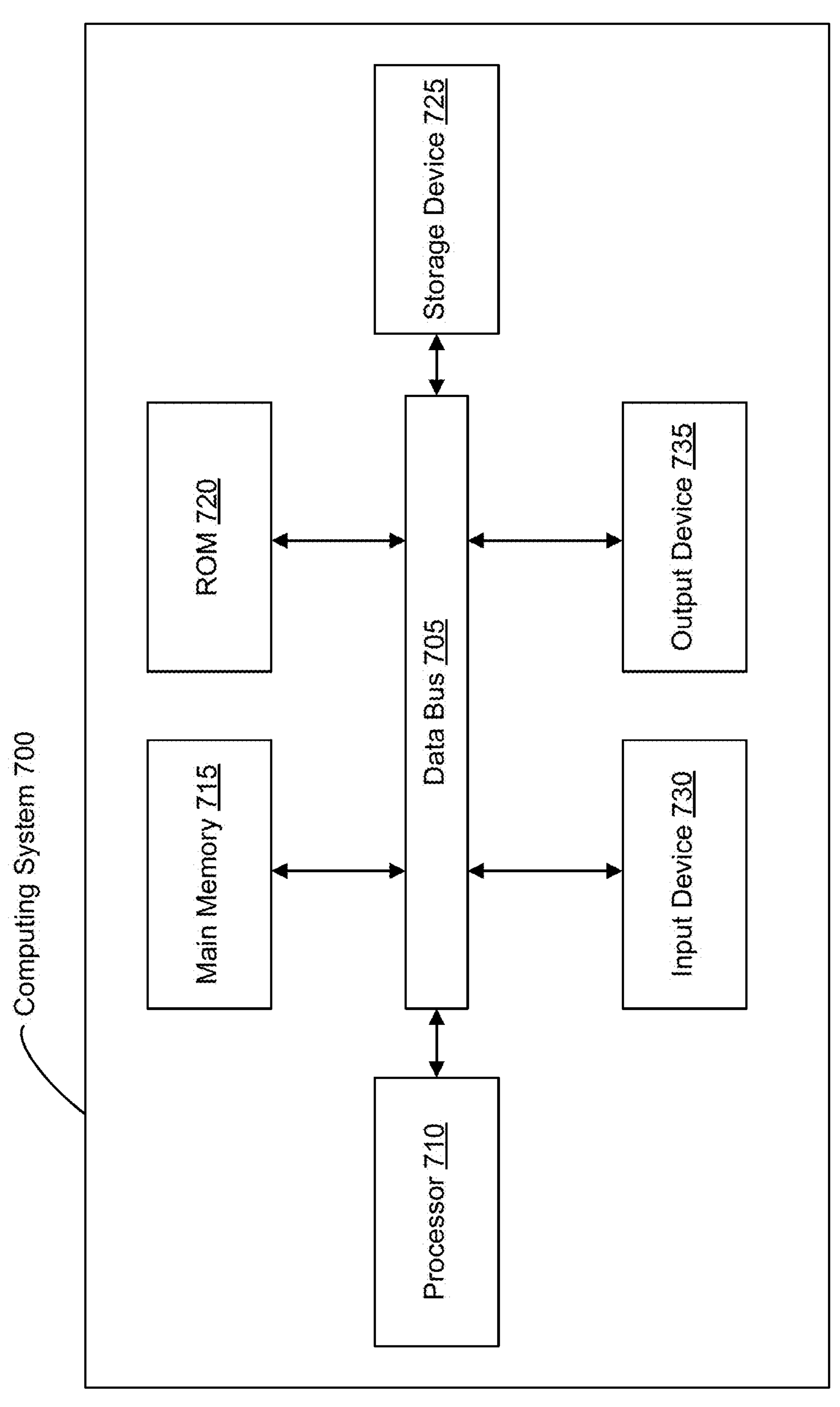
FIG. 7 depicts an illustrative architecture of a computing system implemented in some implementations of the present disclosure.

FIG. 7 depicts an illustrative architecture of a computing system 700. The block diagram of the example computing system 700 can also be referred to as the computer system 700 or a computing environment 700. Computing system 700 can be used to implement elements of the systems and methods described and illustrated herein, such as for example, commands, instructions or data described herein. Computing system 700 can be included in or run any device (e.g., data processing system, client device 115, computing system 135, reverse proxy server 150, remote dictionary server 155, etc.).

Computing system 700 can include at least one data bus 705 or other communication device, structure or component for communicating information or data. Computing system 700 can include at least one processor 710 or processing circuit coupled to the data bus 705 for executing instructions or processing data or information. Computing system 700 can include one or more processors 710 or processing circuits coupled to the data bus 705 for exchanging or processing data or information along with other computing systems 700. Computing system 700 can include one or more main memories 715, such as a random access memory (RAM), dynamic RAM (DRAM), cache memory, or other dynamic storage device, which can be coupled to the data bus 705 for storing information, data and instructions to be executed by the processor(s) 710. Main memory 715 can be used for storing information (e.g., data, computer code, commands, or instructions) during the execution of instructions by the processor(s) 710.

Computing system 700 can include one or more read only memories (ROMs) 720 or other static storage device 725 coupled to the bus 705 for storing static information and instructions for the processor(s) 710. Storage devices 725 can include any storage device, such as a solid state device, magnetic disk, or optical disk, which can be coupled to the data bus 705 to persistently store information and instructions.

Computing system 700 can be coupled via the data bus 705 to one or more output devices 735, such as speakers or displays (e.g., liquid crystal display or active matrix display) for displaying or providing information to a user. Input devices 730, such as keyboards, touch screens, or voice interfaces, can be coupled to the data bus 705 for communicating information and commands to the processor(s) 710. Input device 730 can include, for example, a touch screen display (e.g., output device 735). Input device 730 can include a cursor control, such as a mouse, a trackball, or cursor direction keys, for communicating direction information and command selections to the processor(s) 710 for controlling cursor movement on a display.

The processes, systems and methods described herein can be implemented by the computing system 700 in response to the processor 710 executing an arrangement of instructions contained in main memory 715. Such instructions can be read into main memory 715 from another non-transitory computer-readable medium (CRM), such as the storage device 725. Execution of the arrangement of instructions stored thereon main memory 715 causes the computing system 700 to perform the illustrative processes described herein. One or more processors 710 in a multi-processing arrangement can also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes can be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms “computing device”, “component” or “data processing apparatus” or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may or can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the disclosed elements and operations without departing from the scope of the present disclosure.

What is claimed is:

1. A system, comprising:

one or more processors, coupled with memory, to:

establish a session responsive to receiving a first request from a browser, the session authenticated using a session identifier stored via a cookie, and the session configured to access a first electronic record related to a first plan corresponding to a first identifier, wherein data corresponding to the session is stored in a remote dictionary server and comprises the session identifier stored via the cookie;

identify a second request to modify the session to access a second electronic record related to a second plan corresponding to a second identifier, the second request comprising the cookie;

identify, based on the cookie and a request identifier or location corresponding to the second request, an application programming interface (API) server of a plurality of servers is authorized to update one or more headers of the second request;

access, using the cookie and in response to the second request, the data corresponding to the session from the remote dictionary server;

receive, using a reverse proxy technique, data to update the session; and modify, responsive to receipt of the data to update the session, the session by storing the second identifier in the remote dictionary server to provide the browser with access to the second electronic record via the session that was established for accessing the first electronic record.

2. The system of claim 1, further comprising a reverse proxy server and one or more application programming interface (API) servers.

3. The system of claim 1, wherein the one or more processors further:

display, via a graphical user interface (GUI), one or more elements corresponding to the second plan in the session.

4. The system of claim 1, wherein the one or more processors further:

determine to grant access to the second electronic record based on a determination that access to the first electronic record is authorized.

5. The system of claim 1, wherein the one or more processors further:

determine access to a third electronic record corresponding to a third plan based on determining access to the first electronic record or the second electronic record; and display, via a graphical user interface (GUI), one or more elements corresponding to the third plan in the session.

6. The system of claim 1, wherein the one or more processors further:

forward, by a reverse proxy server, using the reverse proxy technique, a plurality of requests to one or more of plurality of servers by transmitting the second request to a first server of the plurality of servers or transmitting the second request to a second server of the plurality of servers.

7. The system of claim 1, wherein the one or more processors further:

display, via a graphical user interface (GUI), one or more elements corresponding to the first plan;

update, responsive to accessing the remote dictionary server, the one or more elements to correspond with the second plan; and provide the updated one or more elements to the GUI.

8. A method, comprising:

establishing, by one or more processors coupled with memory, a session responsive to receiving a first request from browser, the session authenticated using a session identifier stored via a cookie, and the session configured to access a first electronic record related to a first plan corresponding to a first identifier, wherein establishing comprises storing data corresponding to the session in a remote dictionary server and comprises the session identifier stored via the cookie;

identifying, by the one or more processors, a second request to modify the session to access a second electronic record related to a second plan corresponding to a second identifier, the second request comprising the cookie;

identify, based on the cookie and a request identifier or location corresponding to the second request, an application programming interface (API) server of a plurality of servers is authorized to update one or more headers of the second request:

accessing, by the one or more processors using the cookie and in response to the second request, the data corresponding to the session from the remote dictionary server;

receiving, by the one or more processors, using a reverse proxy technique, data for updating the session; and modifying, by the one or more processors responsive to receiving the data for updating the session, the session by storing the second identifier in the remote dictionary server and providing the browser with access to the second electronic record via the session that was established for accessing the first electronic record.

9. The method of claim 8, further comprising:

displaying, by the one or more processors via a graphical user interface (GUI), one or more elements corresponding to the second plan in the session.

10. The method of claim 8, further comprising:

determining, by the one or more processors, to grant access to the second electronic record based on a determination that access to the first electronic record is authorized.

11. The method of claim 8, further comprising:

determining, by the one or more processors, user access to a third electronic record corresponding to a third plan based on determining user access to the first electronic record or the second electronic record; and displaying, by the one or more processors via a graphical user interface (GUI), one or more elements corresponding to the third plan in the session.

12. The method of claim 8, further comprising:

forwarding, by a reverse proxy server using the reverse proxy technique, a plurality of requests to one or more of a plurality of servers by transmitting the second request to a first server of the plurality of servers or transmitting the second request to a second server of the plurality of servers.

13. The method of claim 8, further comprising:

displaying, by the one or more processors via a graphical user interface (GUI), one or more elements corresponding to the first plan;

updating, by the one or more processors and in response to accessing the remote dictionary server, the one or more elements to correspond with the second plan; and providing, by the one or more processors, the updated one or more elements to the GUI.

14. A non-transitory computer-readable media (CRM) having instructions stored thereon that, when executed by one or more processors, cause the one or more processors to:

establish a session responsive to receiving a first request from a browser, the session authenticated using a session identifier stored via a cookie, and the session configured to access a first electronic record related to a first plan corresponding to a first identifier, wherein data corresponding to the session is stored in a remote dictionary server and comprises the session identifier stored via the cookie;

identify a second request to modify the session to access a second electronic record related to a second plan corresponding to a second identifier, the second request comprising the cookie;

identify, based on the cookie and a request identifier or location corresponding to the second request, an application programming interface (API) server of a plurality of servers is authorized to update one or more headers of the second request;

access, using the cookie and in response to the second request, the data corresponding to the session from the remote dictionary server;

receive, using a reverse proxy technique, data to update the session; and modify, responsive to receipt of the data to update the session, the session by storing the second identifier in the remote dictionary server and providing the browser with access to the second electronic record via the session that was established for accessing the first electronic record.

15. The non-transitory CRM of claim 14, wherein the instructions cause the one or more processors to further:

display, via a graphical user interface (GUI), one or more elements corresponding to the second plan in the session.

16. The non-transitory CRM of claim 14, wherein the instructions cause the one or more processors to further:

determine access to a third electronic record corresponding to a third plan based on a determination of access to the first electronic record or the second electronic record; and display, via a graphical user interface (GUI), one or more elements corresponding to the third plan in the session.

* * * * *